Jan. 31, 1928.
H. H. INGE ET AL
1,657,929
AUTOMOBILE AIR BRAKE
Filed June 22, 1927
4 Sheets-Sheet 1
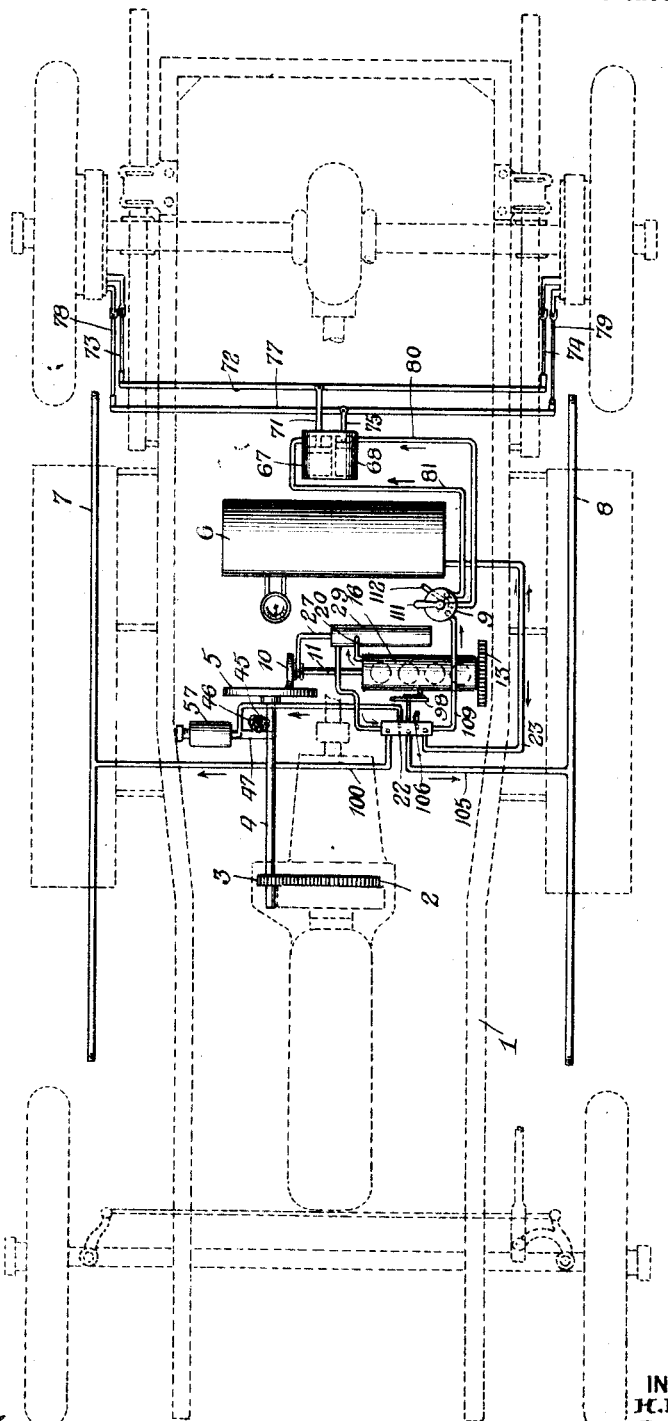
WITNESSES
INVENTORS
H. H. Inge
R. A. Smith
BY
ATTORNEY

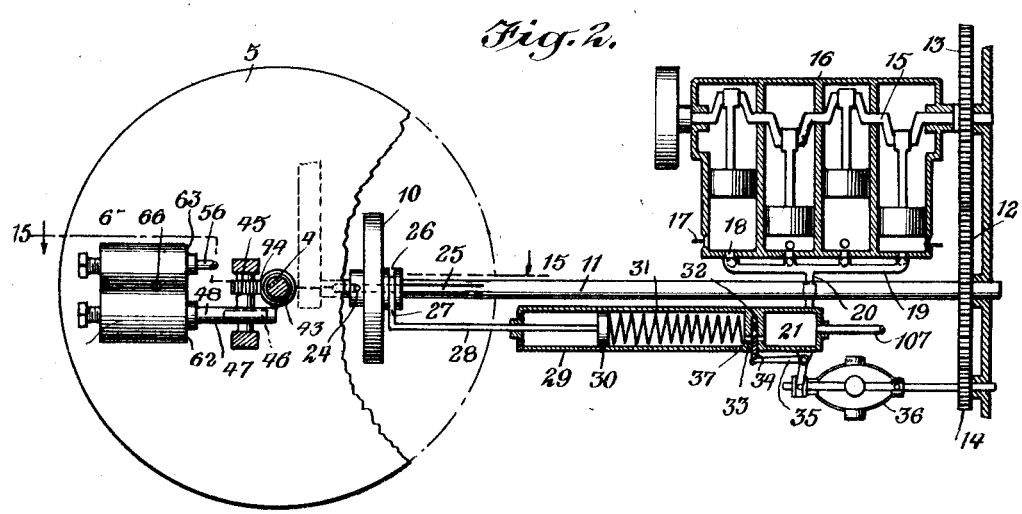
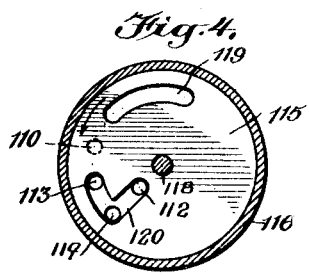
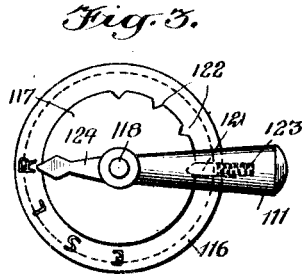
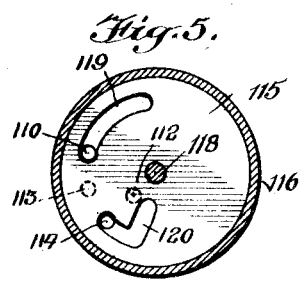
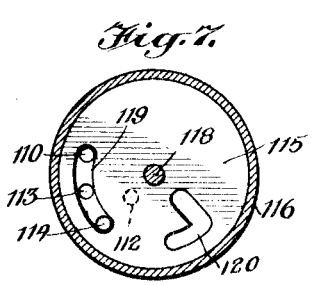
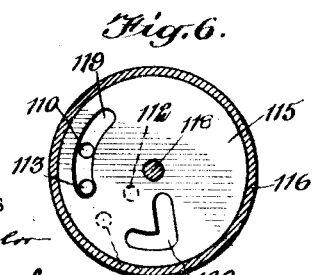

Jan. 31, 1928.
H. H. INGE ET AL
1,657,929
AUTOMOBILE AIR BRAKE
Filed June 22, 1927
4 Sheets-Sheet 3
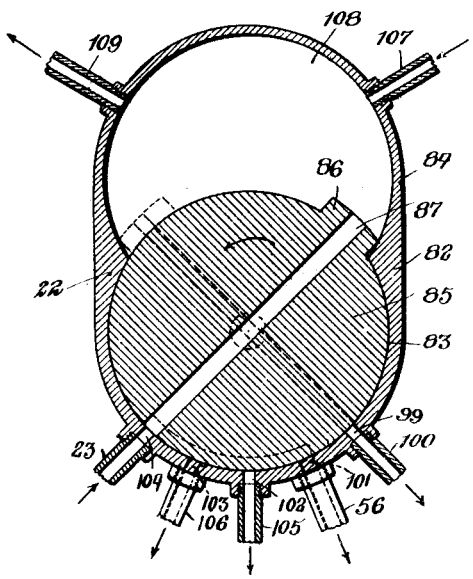
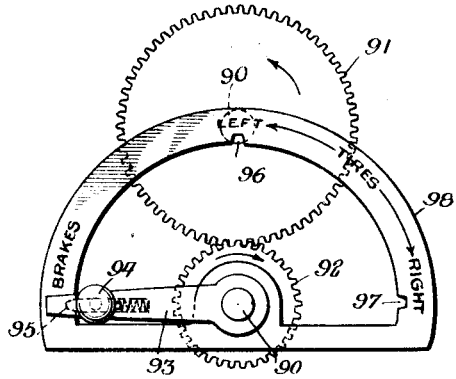
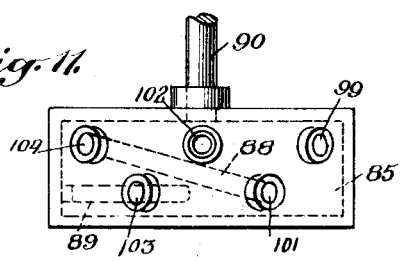
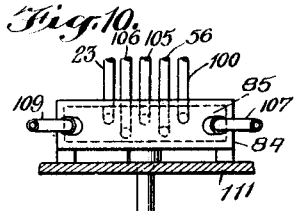
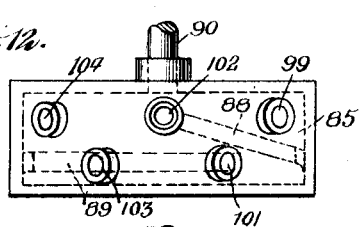
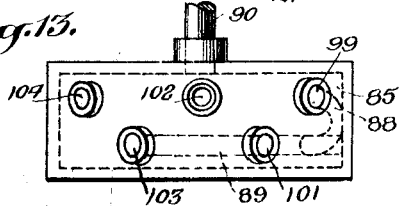
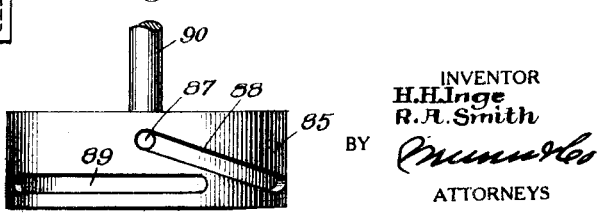
INVENTOR
H. H. Inge
R. A. Smith
BY
ATTORNEYS

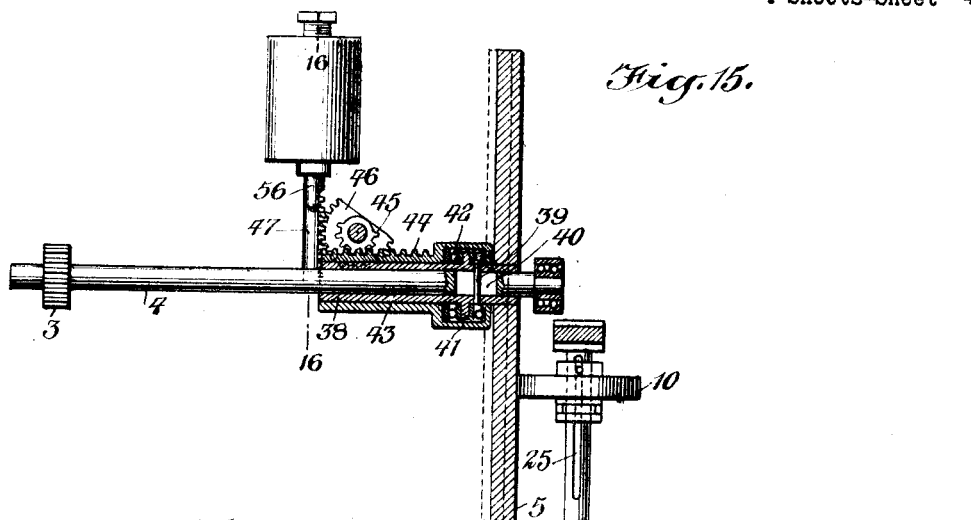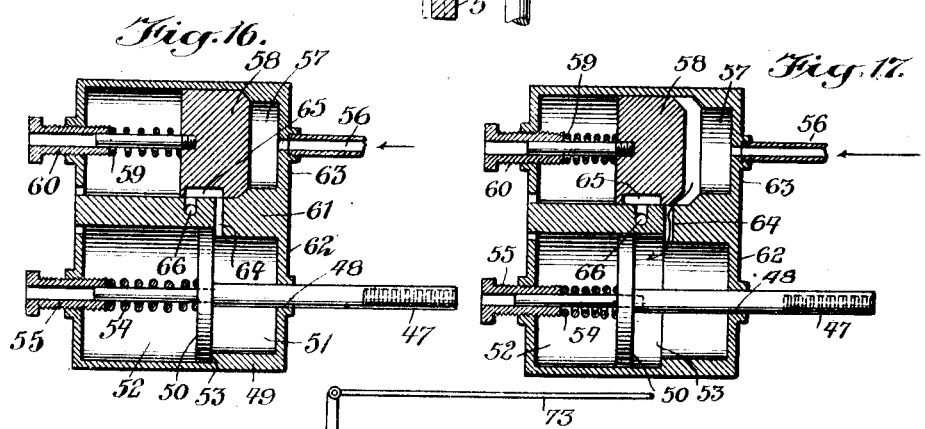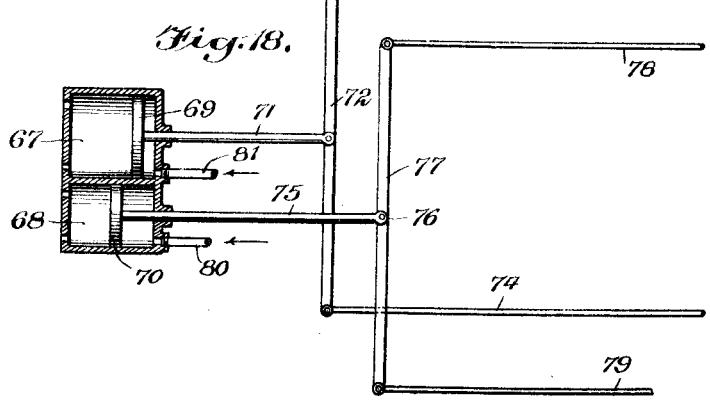

Patented Jan. 31, 1928.

1,657,929

UNITED STATES PATENT OFFICE.

HAROLD H. INGE, OF NEW YORK, N. Y., AND RUSSELL A. SMITH, OF LOS ANGELES, CALIFORNIA.

AUTOMOBILE AIR BRAKE.

Application filed June 22, 1927. Serial No. 200,737.

This invention relates to an improved automobile air brake, and has for an object to provide a construction wherein an air brake system is presented, together with means for maintaining a reserve supply of air at all times.

Another object of the invention is to provide an air brake system for automobiles, wherein an attachment and suitable adjustable parts are presented whereby air may be taken off from the system to inflate the tires of the automobile, the arrangement being such that the air for the tires may be under greater pressure than for the brake system.

A further object of the invention is to provide in an air brake system for automobiles, an air pump and means for automatically connecting and disconnecting the same with the automobile engine.

In the accompanying drawings—

Figure 1 is a diagram in plan, of an automobile with an embodiment of the invention also in diagram, applied thereto.

Figure 2 is a view partly in section and partly in elevation, illustrating the pump and power connections therefrom, together with certain of the air distributing members.

Figure 3 is a plan view of a hand operated control valve, controlling the air to the brakes.

Figure 4 is a horizontal sectional view through Figure 3 immediately below the covering plate thereof, and illustrating the parts in position indicated by the arrow in Figure 3.

Figure 5 is a view similar to Figure 4 but showing the parts advanced to a holding or lapped position.

Figure 6 is a view similar to Figure 5 but showing the parts advanced to a position for causing the service brakes to operate.

Figure 7 is a view similar to Figure 6, but showing the parts advanced still further so as to occupy the position for causing the emergency and service brakes to both function.

Figure 8 is a vertical sectional view through what may be termed a central or control valve.

Figure 9 is an elevation of a control arm, a segment co-acting therewith and certain other parts.

Figure 10 is a top plan view of the structure shown in Figure 9.

Figure 11 is a bottom plan view of the structure shown in Figure 8.

Figure 12 is a view similar to Figure 11, but showing the rotary member advanced to a new position.

Figure 13 is a view similar to Figure 12 but showing the rotary member in dotted lines, advanced to a second position.

Figure 14 is a plan view of the rotary member shown in dotted lines in Figures 11 to 13 inclusive, and in full lines in Figure 8.

Figure 15 is a horizontal sectional view through the driving disk and associated parts shown in Figure 2.

Figure 16 is a fragmentary sectional view through Figure 15, approximately on line 16—16.

Figure 17 is a view similar to Figure 16 but showing the parts in an advanced position.

Figure 18 is a view partly in plan and partly in section, showing the brake cylinders and associated parts.

Referring to the accompanying drawings by numerals, 1 indicates an automobile of any desired kind provided with a starting gear 2 meshing continually with a pinion 3. A shaft 4 is rigidly connected with the pinion 3 and continually rotates therewith, said shaft accommodating a power disk 5. In the accompanying drawings, the power has been shown as having been taken from the gear wheel associated with the starting mechanism of the automobile, but it will be evident that the power could be transmitted to shaft 4 from the parts driving the fan wheel or from some other part associated with the engine. In taking power from shaft 4, it is aimed to operate mechanism hereinafter fully described, for maintaining a certain air pressure in tank 6 and if desired, securing a higher air pressure in the respective pipes 7 and 8, said pipes 7 and 8 being connected by a suitable hose to the right and left tires, for the purpose of inflation.

In the use of the device, the brake system is practically thrown out of operation when air is being supplied to the pipes 7 and 8, and the reverse is true, namely, pipes 7 and 8 are thrown out of operation when the brake system is in active use. As means hereinafter fully described will automatically cause tank 6 to be supplied with air at a given pressure, it will then only be necessary to operate the hand actuated brake valve 9 to apply the brakes or to release the brakes. As the air is lost by applying and releasing the brakes, the pump and associated parts hereinafter fully described, will restore the air pressure to tank 6 so that a continuous supply is maintained as long as the engine of the automobile is running.

The disk 5 is connected with shaft 4 as hereinafter fully described, whereby said disk continually rotates as long as shaft 4 rotates. This design is designed to rotate the auxiliary or driving disk 10, which in turn rotates the shaft 11 (Figure 2.) This shaft is carried by suitable bearings and has a gear wheel 12 rigidly secured thereto meshing continually with the gear wheel 13 and with the pinion 14. The gear wheel 13 is rigidly secured to the crank shaft 15 of the pump structure 16. This pump structure is of any well known type and is shown with four pistons, though a greater or less number could be used without departing from the spirit of the invention. It will, of course, be noted that there is an intake valve 17 for each of the cylinders of the pump and an outlet opening or passage-way 18 for each cylinder. Preferably these openings 18 are connected together by a single pipe 19 which is in continuous communication with pipe 20 and pipe 20 in turn discharges into the chamber 21. From chamber 21, the air passes through the control valve 22 hereinafter fully described, and from thence passes by way of pipe 23 to the tank or reservoir 6. The driving disk 10 is slidingly mounted on shaft 11 but connected thereto by reason of the pin 24 extending through the hub of the disk and through the slot 25 in shaft 11. Disk 10 is also provided with an annular groove 26 in one end of the hub, said groove accommodating the fork member 27 to which a rod 28 is secured, said rod extending through a suitable opening in the casing 29 so that the piston 30 may be secured to the end of rod 28 within the casing 29. The casing 29 is preferably round so as to present a cylinder formation. A spring 31 acts continually on piston 30 to move the same in one direction, namely, so that rod 28 and associated parts will force the disk 10 toward the center of the power disk 5. During the operation of the power disk 5, disk 10 will, by centrifugal force, gradually move outwardly or away from the center of the disk 5 as the parts move faster and faster. This movement is against the action of spring 31, which spring is comparatively weak but sufficiently strong to force the disk 10 back to its original position near the center of disk 5 when unresisted.

As indicated clearly in Figure 2, a partition 32 is arranged between chamber 21 and the cylinder or casing 29, said partition having an opening or port 33 normally closed by the sliding plate or valve 34. This plate or valve is provided with a port so that when the port is in registry with the passage-way 33, air will pass from chamber 21 into the casing or chamber 29 in back of piston 30 and will quickly move the piston 30, rod 28 and associated parts so as to shift disk 10 to a point near the center of disk 5 and thereby reduce the speed of shaft 11 and the speed of operation of the pump structure 16. After the speed of the pump 16 has been reduced, the bell crank lever 35 will move the plate or valve 34 back to its former position so that the port therein will be out of registry with the passage-way or opening 33. This movement is caused by a governor 36 operatively associated with the bell crank lever 35 and also connected with the pinion 14. A very small aperture or pin hole 37 is provided in the casing 29, said aperture or pin hole acting to bleed the casing of air, as soon as passage-way 33 has been closed.

As heretofore mentioned, the power is automatically turned onto the pump 16 and automatically removed therefrom. This is caused by the structure particularly shown in Figures 2, 15, 16 and 17. As indicated in Figure 15, disk 5 is slidingly mounted on shaft 4 and may be slid into and out of engagement with the disk 10. As indicated particularly in Figure 15, disk 5 is rigidly secured to a sleeve 38 which is loosely mounted on shaft 4 but provided with a pin 39 extending through a slot 40 in shaft 4. Sleeve 38 is also provided with an annular flange 41 arranged between suitable ball bearing members carried in the enlargement 42 of the auxiliary sleeve 43. The auxiliary sleeve 43 is formed with teeth 44 at one point whereby a rack structure is presented so that the sleeve functions as a rack and acting through the ball bearing and flange 41 is able to move disk 5 toward and from disk 10 without shifting the shaft 4. A pinion 45 continually meshes with the teeth or rack 44, said pinion being rigidly connected with a gear wheel 46 continually meshing with a rack 47 secured to the piston rod 48 or formed integral therewith. This piston rod is slidingly fitted into a cylinder 49 and carries a piston 50 at the rear end. The piston 50 divides the cylinder into two chambers, namely, chambers 51 and 52, the chamber 51 being slightly within chamber 52 whereby a shoulder 53 is presented, said shoulder being adapted to act as an abutment for piston 50 and limit its movement in one direction under the action of the spring 54. The spring 54 bears against the threaded tubular member 55, which member acts to vary the tension of the spring as circumstances may demand. When the piston 50 and associated parts are in the position shown in Figure 15, disk 5 is in firm contact or engagement with disk 10.

When it is desired, or when the mechanism properly functions to disengage the two disks 5 and 10, air under considerable pressure will pass through the pipe 56 into the chamber 57 and act on the sliding valve 58 for forcing the same against the action of spring 59 to substantially the position shown in Figure 17. Spring 59 is maintained under the desired tension by the adjustment of the threaded sleeve 60. The partition 61 between the casings 62 and 63 is provided with a port 64 which registers with the passage-way 65 when the sliding valve 58 is closed. The passage-way 65 also registers with the exhaust port 66 when valve 58 is closed, said exhaust port 66 being open to the atmosphere so that when the parts are moved to the position shown in Figure 16, any air pressure in chamber 51 will be quickly exhausted out through the port 64, passage-way 65 and port 66. When valve 58 has been moved to the position shown in Figure 17, port 64 will be open to the chamber 57 and port 66 will be shut off so that the air from the chamber 57 will enter the chamber 51 and act on the piston 50 for moving the same against the action of spring 54. This will cause the rod 48 and rack 47 to be pulled for rotating in one direction the gear wheel 46, which in turn will partly rotate the pinion 45 and pull sleeve 43, disk 5 and associated parts to the dotted position shown in Figure 15, thus disconnecting the power from disk 10. As soon as the air pressure in the pipe 56 and chamber 57 has been reduced to a certain extent, spring 59 will overcome said pressure and force valve 58 back to the position shown in Figure 16, whereupon chamber 51 will be open to the atmosphere and will quickly exhaust so that spring 54 will quickly force the rod 48 and rack 47 back to their former positions. The forcing back of the rack and associated parts will force the disk 5 against disk 10 so that power is again connected with the disk 10 for operating the pump. This action is more or less intermittent as air is used by the brakes through the usual operation of the automobile, but this automatic action maintains substantially constant pressure in tank 6.

As indicated in Figure 18, there is provided an emergency brake cylinder 67 and a service brake cylinder 68. These cylinders are of identical structure except that one is larger than the other. The cylinder 67 is provided with a piston 69 while cylinder 68 is provided with a piston 70. Piston 69 is connected with a piston rod 71 which in turn is pivotally connected with a cross bar 72 and said cross bar in turn is connected with the pull rods 73 and 74 which are connected to any suitable brake mechanism of the automobile. The piston 70 is similarly connected up, namely, to the rod 75, which rod is pivotally connected at 76 to a cross bar 77 carrying the pull rods 78 and 79 connected to suitable brake mechanism of the automobile. Whenever air is admitted into the cylinder 68 through pipe 80, the service brakes will function and whenever air is admitted through pipe 81 to cylinder 67, the emergency brakes will function. Suitable means as hereinafter fully described are provided for permitting the service brakes to be operated alone or whenever desired if the emergency brakes operate substantially simultaneously therewith and function at the same time to provide a maximum braking effect. This mechanism includes part of the control valve shown in Figure 8 and certain other figures and also the valve shown in Figures 3 to 7 inclusive. A control valve 22 is formed with a casing 82 having bores 83 and 84, said bores overlapping somewhat. A rotating or rockable valve member 85 is fitted into bore 83 while bore 84 presents a communicating and reserve chamber. The valve member 85 is provided with an extension 86 which limits its rotary, or rather, rocking movement. A passage-way or bore 87 extends through the valve member 85 and through the extension 86. This bore is off the center line of the valve member 85, as shown in Figure 14. On the face of the valve member 85 (Figure 14), there is provided an inclined or diagonally positioned groove 88 with one end in communication with the passage-way 87 and the opposite end substantially in line with the second groove 89. A shaft 90 is rigidly secured in any desired manner to the center of valve member 85 and extends through the casing 82 any desired distance. A gear wheel 91 is rigidly secured to the shaft 90, said gear wheel meshing with the pinion 92 continually. A lever 93 is rigidly secured to shaft 90, said lever having a suitable spring pressed catch 94 adapted to snap into any of the notches 95, 96 and 97 in the quadrant or guide 98. As indicated in Figure 9, the position of lever 93 is termed a braking position.

When it is desired to pump the tires on the left side of the automobile, the parts are moved so that catch 94 will snap into notch 96. When it is desired to pump the tires on the right side of the automobile, lever 93 is moved so that catch 94 will snap into notch 97. As pinion 92 is only half the size of gear wheel 91, a half revolution of this pinion will only cause a quarter of a revolution of the valve member 85 so that when the lever 93 is in the position shown in Figure 9, the passage-way 87 will be in the position shown in Figure 8. When lever 93 is moved over to notch 97, the passage-way 87 will be moved to a position for communicating with the port 99, which port is connected through pipe 100 to the pipe 7 shown in Figure 1.

As indicated in Figures 8 and 11 to 13 inclusive, casing 82 is provided with ports 99, 101, 102, 103 and 104. As just described, port 99 leads through pipe 100 to pipe 7, and port 102 leads through pipe 105 to pipe 8. These two ports supply air to the respective sides of the automobile and when they are functioning, the other ports are closed. Port 104 is connected to the tank or reservoir 6 by the pipe 23 and air is adapted to pass in both directions through this pipe, namely, from the control valve 22 to the tank 6 and from the tank 6 back to the control valve 8. The port 103 is connected through a suitable pipe 106 to the atmosphere whereby exhaust air may be discharged out at any desired point under the automobile. Port 101 is connected by pipe to the trip valve shown in Figure 16.

As indicated in Figure 2, the air from the pump is first discharged into the chamber 107 and passes from this chamber through the pipe 107 to the chamber 108 which is formed in the bore 84 (Figure 8). It will thus be seen that whenever the pump is functioning, air will be forced into the chamber 108 and if the valve shown in Figure 3 is properly set, it will pass to the brake cylinder shown in Figure 18 or to the main reservoir or tank 6 when valve member 85 is set as shown in Figure 8. In case the air pumps are not functioning, air from the main reservoir or tank 6 will pass through pipe 23 into passage-way 87 and from thence through the chamber 108 to the brake cylinders after passing through valve 9. It will be noted that the pipe 109 leading out from chamber 108 is connected to the port 110 of the brake valve shown in Figures 3 to 7. The control valve is normally positioned as shown in Figure 8 and left continually in that position during the usual operation of the automobile. This valve may be adjusted to this position readily as this valve is mounted on a dashboard 111 as shown in Figure 10 and the quadrant 98, lever 93 and associated parts are mounted on the instrument board 112. The driver may at any time shift the lever 93 so as to have the brake system in operation or have the system used for supplying air to pipes 7 and 8. The pipes 7 and 8 are preferably under the running board of the automobile and, therefore, are out of the way but in position for the reception of a hose at any time. When the lever 93 is moved to the position marked left in Figure 9, passage-way 87 is moved to a position in communication with port 102 whereupon air from the pumps will be supplied to pipe 105 but the air in tank 6 will be shut off or confined in said tank. At the same time that this takes place, passage-way 89 will be moved to a position in communication with the ports 103 and 101. This will cause the chamber 57 of the trip valve to be exhausted and, consequently, rack 47 and associated parts will remain in such a position that the disk 5 will remain continually in contact with the disk 10. This will permit the pump to continually function and cause air under pressure to be supplied to the tires to any limit, or rather to the limit of the power of the pumps which is much higher than the pressure normally maintained in tank 6. If the chamber 57 was not exhausted or bled in this manner, the extra pressure would cause piston 50 and associated parts to function. When the lever 93 is moved over to the position marked right in Figure 6, passage-way 87 (Figure 8) will be brought into registry with the port 99. Passage-way 89 will continue to function to keep the chamber 57 in communication with the atmosphere, though this is not very essential as no air can enter this chamber until the parts are moved back to the position shown in Figure 8. When the parts are moved back to this position, air will immediately pass through the passage-way 88 to port 101 and from thence to chamber 57. At this time the air is not sufficient to unseat the valve member 58 and, consequently, pump 16 will continue to function. As soon as the pressure in tank 6 has been raised to a certain extent, the parts will assume the position shown in Figure 17 and thus disconnect the power from the pump.

In Figures 1 and 3 to 7 inclusive, will be seen a control valve for permitting air to enter either one or both of the brake cylinders 67 and 68. As indicated in Figure 1, the pipe 109 provides communication between the chamber 108 in the control valve 22 and the port 110 in the hand operated brake valve 9. By an actuation of the handle 111, the port 110 may be brought into communication with either or both of the pipes 80 and 81. Also by a manipulation of the handle 111, the pipes 80 and 81 may be opened to the atmosphere through the exhaust port 112. Pipes 80 and 81 lead to the ports 113 and 114 respectively. These ports may be all closed by the disk 115 which snugly fits into the casing 116. A cover 117 fits onto the casing 116 and closes the top, though the shaft 118 extends through this cover so as to be rigidly secured to the handle 111 and also rigidly secured to the disk 115, which disk acts as a valve member. Disk 115 is provided with a comparatively long arc-shaped slot 119 and with a substantially L-shaped slot 120. The handle 111 is provided with a spring pressed catch 121 which is normally in one of the notches 122 but which may be moved from one notch to the other against the action of the spring 123 by a decided push against the handle. A pointer 124 extends from handle 111 and is adapted to point at the various legends or designations shown in Figure 3, the same being the letters R, L, S and E. When the pointer 124 is at R, the brake cylinders are released and the pipes 80 and 81 are open to the atmosphere. When the pointer 124 is first moved over to the position marked L in Figure 3, no exhaust will be produced as slot 119 is merely brought into communication with port 110. If the handle is m.,ed further over until pointer 124 stops at S in Figure 3, the relative parts will then assume the position shown in Figure 6 with port 110 in communication with the port 113 through the slot 119. When in this position, air quickly flows from the reservoir 6 if the pumps are not operating, said air passing through the pipe 23, chamber 108 and from thence through pipe 109 to port 110, through slot 119, port 113 and pipe 80 to the cylinder 68. This will cause the service brakes to be applied and if the pointer 124 is left stationary over the position S, the brakes will be applied with the full force of the entire pressure of container or reservoir 6. If the full pressure is not necessary or desirable, the pointer 124 is moved back to the position L shown in Figure 3 when the desired braking effect has been secured, as for instance, a slight braking in order to slow down the momentum of the car. In case t should be desired to stop the car quickly, as in an emergency, pointer 124 is quickly swung from in position over to a position over the letter E in Figure 3. This will cause the slot 119 to provide communication between the port 110 and the respective ports 113 and 114 as shown in Figure 7, whereby air will rush through pipes 80 and 81 of the cylinders 67 and 68. This will apply both the service and emergency brakes. By moving the handle back until the L-shaped slot 120 is in communication with the port 112 but not in communication with the port 113, the emergency cylinder will be open to the atmosphere and, therefore, relieved. By moving the lever 111 still further back or until the slot 120 is in communication with port 113, a similar result will take place in regard to the service brake, namely, the opening of the cylinder 68 to the atmosphere. This results in the parts again assuming the position shown in Figures 3 and 4 with both brakes released. If desired, the lever could be moved over until pointer 124 is over letter S in Figure 3, and then back to a position over the letter L shown in Figure 3. When this takes place, air is admitted to the service brake cylinder 68 and then the communication cut off with port 110 but without releasing the air. This is the usual position in which the car is left when parking.

It will be noted from the above described that when the tires are to be pumped up, lever 93 is moved over to engage respectively the notches 96 and 97 as shown in Figure 9. After the tires have been properly pumped, the lever 93 is moved back until catch 94 engages notch 95. This is the normal position in which the parts are left. When in this position the driver may manipulate the handle 111 as desired and as above described for applying either brake or both brakes and for releasing the brakes at any time. It will also be noted that by reason of the construction shown particularly in Figures 15, 16 and 17, power from the engine is intermittently connected to the pump for causing the pump to operate whenever necessary to restore or maintain a given pressure in the reservoir 6.

What we claim is:

1. An automobile air brake system, comprising brake structures associated with certain wheels of the automobile, means for causing said brake structures to function, said means including a hand operated valve, an air pump, and means for driving said air pump from the engine of the automobile, air pipes extending from said pump for supplying air to the tires of the automobile, and a control valve for connecting said pipes with said pump and with the means for applying said brakes, said control valve being manually adjustable to a position for supplying air to said brake applying means or for supplying air to said pipes.

2. In an air brake system for automobiles, a brake cylinder, a piston arranged in said brake cylinder, a pipe for supplying air to said brake cylinder for causing said piston to move in one direction, a control valve for admitting and exhausting air to and from the brake cylinder, means for supplying air to said valve, said means including a reservoir, a pump and a control valve, and means for automatically connecting and disconnecting said pump with the driving mechanism of the automobile, said means automatically functioning for causing a connection with the engine of the automobile when the pressure in the reservoir has been reduced, and automatically disconnect said pump from said engine when the pressure has reached a certain point.

3. In an automobile air brake system, a service air brake cylinder, an emergency air brake cylinder, a piston arranged in each cylinder, a pipe extending to each of said cylinders, a hand operated control valve operatively associated with both of said pipes, means for supplying air under pressure to said valve, said valve being capable of movement for successively turning air and rack operatively associated with the said second toothed member, a spring for moving said second rack in one direction, and pneumatically actuated means for moving said second rack in the opposite direction whereby said power disk is slid back and forth longitudinally of said shaft so as to be brought into and moved out of contact with said driving disk.

7. In an automobile air brake system, a pump for supplying air, means for driving said pump, said means including a power friction disk and a driving friction disk positioned to engage the face of the power disk, means tending to keep said driving disk near the center of the power disk, said last mentioned means including a piston and a spring, a cylinder surrounding said piston and spring, means forming the chamber for receiving air from said pump, a division member formed with a passage-way presenting a port between the means for receiving the air from said pump and said cylinder, a valve normally closing said port, and means including a governor connected with said pump and with said valve for opening the valve when the pump maintains a certain speed whereby air will enter said cylinder and act on said piston for moving the piston in such a direction as to move the driving disk toward the center of said power disk.

8. In an automobile air brake system, a pump for supplying air under pressure, means for driving said pump, means forming a chamber for receiving air from said pump, a cylinder arranged adjacent said chamber, a port presenting communication between said chamber and cylinder, a valve arranged to normally close said port, a bell crank lever connected with said valve, a governor structure connected with said bell crank lever and operatively connected with the pump whereby the pump will drive the governor, the parts being so proportioned that when the pump reaches a certain speed the governor will move the valve to an open position so that air may pass from said chamber into said cylinder, and means extending into the cylinder adapted to be actuated by the air entering the cylinder to reduce the speed of said driving means.

HAROLD H. INGE.
RUSSELL A. SMITH.